March 11, 1952     D. TRINGALI     2,588,671
HOLDER FOR RADIO ON VEHICLE HANDLE BARS
Filed Aug. 19, 1947
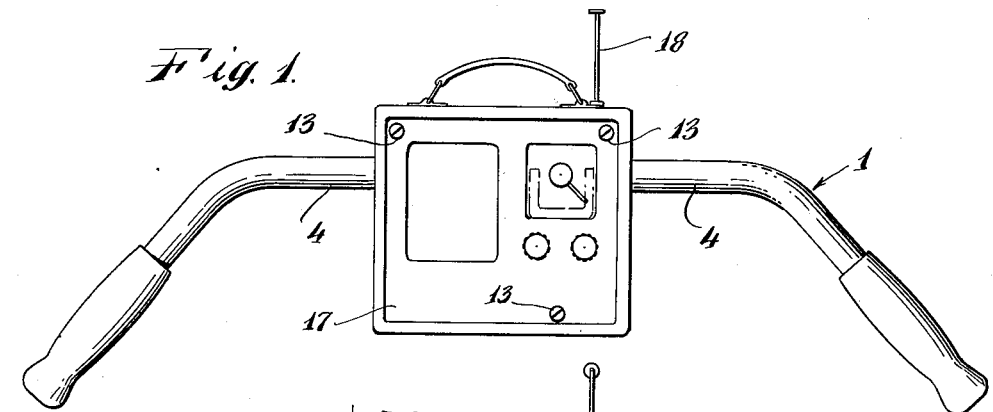
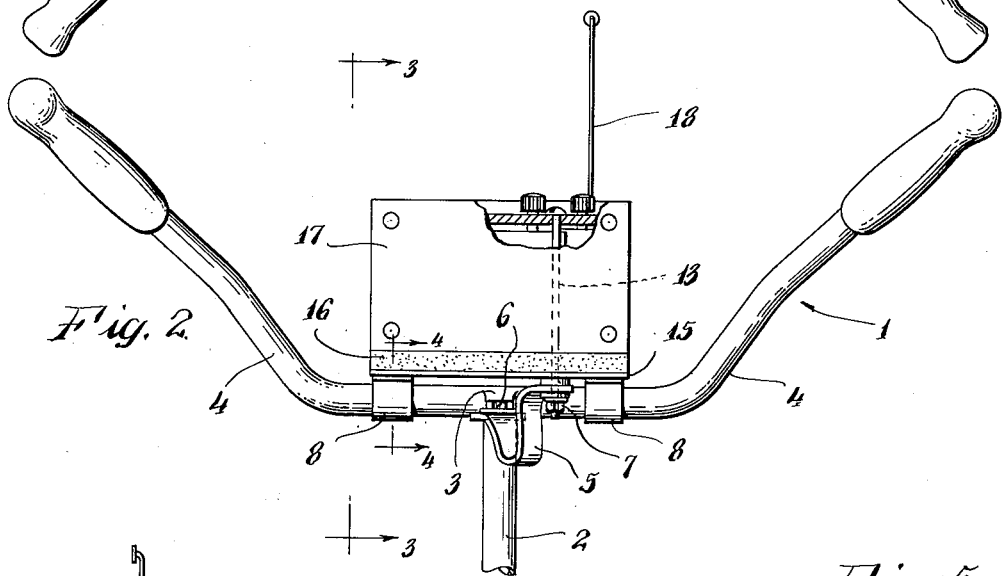
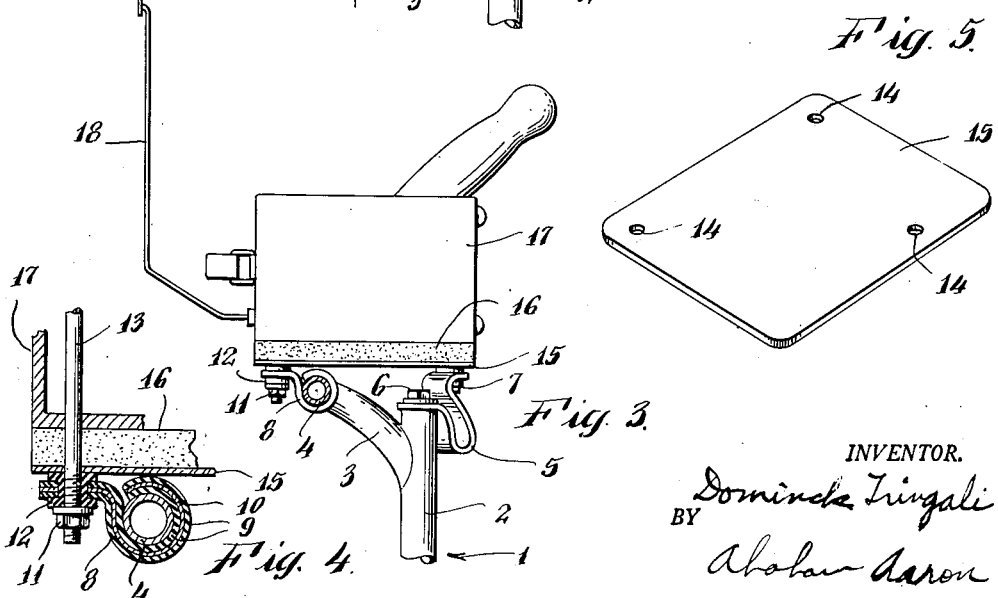
INVENTOR.
Dominick Tringali
BY
Abraham Aaron
ATTORNEY Patented Mar. 11, 1952

2,588,671

UNITED STATES PATENT OFFICE 2,588,671

HOLDER FOR RADIO ON VEHICLE
HANDLE BARS

Dominick Tringali, Brooklyn, N. Y.

Application August 19, 1947, Serial No. 769,437

1 Claim. (Cl. 224—30)

The purpose of my invention is to provide a holder for a radio on a handle bar which, for purposes of illustration, is secured to a bicycle, but may be secured to any handle bar on any type of moving vehicle.

Referring to the drawings which illustrate my invention in which

Figure 1 is a top plan view.

Figure 2 is a side elevation.

Figure 3 is a section on the line 3—3 of Figure 2.

Figure 4 is a section on the line 4—4 of Figure 2.

Figure 5 is a perspective of the mounting plate.

Referring specifically to the drawing in which the bicycle handle 1, has a bicycle post 2, an upturned mounted extention 3, the straight portion of the handle 4, the flexible mounting strap 5, the securing screw 6 which holds the member 5. The nut 7 secures the bolt 13 through the radio. The flexible mounting strap 8, the outer covering strap of rubber 9, an inner core strap 10 are placed over the handle 4. The securing nut 11 also has a rubber grommet 12 thereon, which is placed on another of the bolts 13. The holes 14 are used to retain the bolts 13 in plate 15 on which the felt absorber 16 is set, to retain the radio 17 on which the antenna 18 is shown.

Although the drawings and specification disclose the best method in which I have contemplated embodying my invention, I desire in no way to be limited to the details of such disclosure, for in the further application of my invention, slight changes in form and proportions may be made without departing from the spirit of the invention within the broad scope of the appended claim.

What I claim as new and novel is:

A carrier for a radio receiving set comprising a flat plate adapted to be secured to a radio, said flat plate containing 3 bolt holes, two rigid plate supporting members, said rigid plate supporting members consisting of a curved metallic portion curved around the opposing handlebars of a bicycle, the opposing end of said rigid plate supporting members being flat and in a horizontal plane, a hole in the flat end of said rigid plate supporting members, a pair of bolts connecting said rigid plate supporting members to said plate at 2 of said plate holes in a line substantially parallel with the plane of the bicycle, handlebars, the bolts serving to connect said radio receiving set to said plate at its upper portion, a flexible plate supporting member containing a pair of bolt holes, one hole being disposed at each end, a bolt passing through one of said bolt holes and a bicycle post serving to secure the flexible plate supporting member to the bicycle post, said flexible plate supporting member being U-shaped, a second bolt passing through the holes at the opposing side of said U-shaped member and connecting said opposing side to the radio supporting plate at a point opposite the point of connection to the plate of the rigid support members.

DOMINICK TRINGALI.

REFERENCES CITED

The following references are of record in the file of this patent:

UNITED STATES PATENTS

| Number | Name | Date |
|---|---|---|
| 481,890 | Blood | Aug. 30, 1892 |
| 1,908,535 | Pawsat | May 9, 1933 |
| 2,109,315 | Harley | Feb. 22, 1938 |
| 2,321,192 | Fischer | June 8, 1943 |
| 2,436,991 | Dirksen | Mar. 2, 1948 |

FOREIGN PATENTS

| Number | Country | Date |
|---|---|---|
| 790,906 | France | Sept. 16, 1935 |